INVENTOR.
CHILDRESS B. GWYN, JR.

BY
OSTROLENK, FABER, GERB & SOFFEN
ATTORNEYS

INVENTOR.
CHILDRESS B. GWYN, JR.

BY
OSTROLENK, FABER, GERB & SOFFEN
ATTORNEYS

INVENTOR.
CHILDRESS B. GWYN, JR.

BY
OSTROLENK, FABER, GERB & SOFFEN

ATTORNEYS

INVENTOR.
CHILDRESS B. GWYN, JR.
BY
OSTROLENK, FABER, GERB & SOFFEN
ATTORNEYS

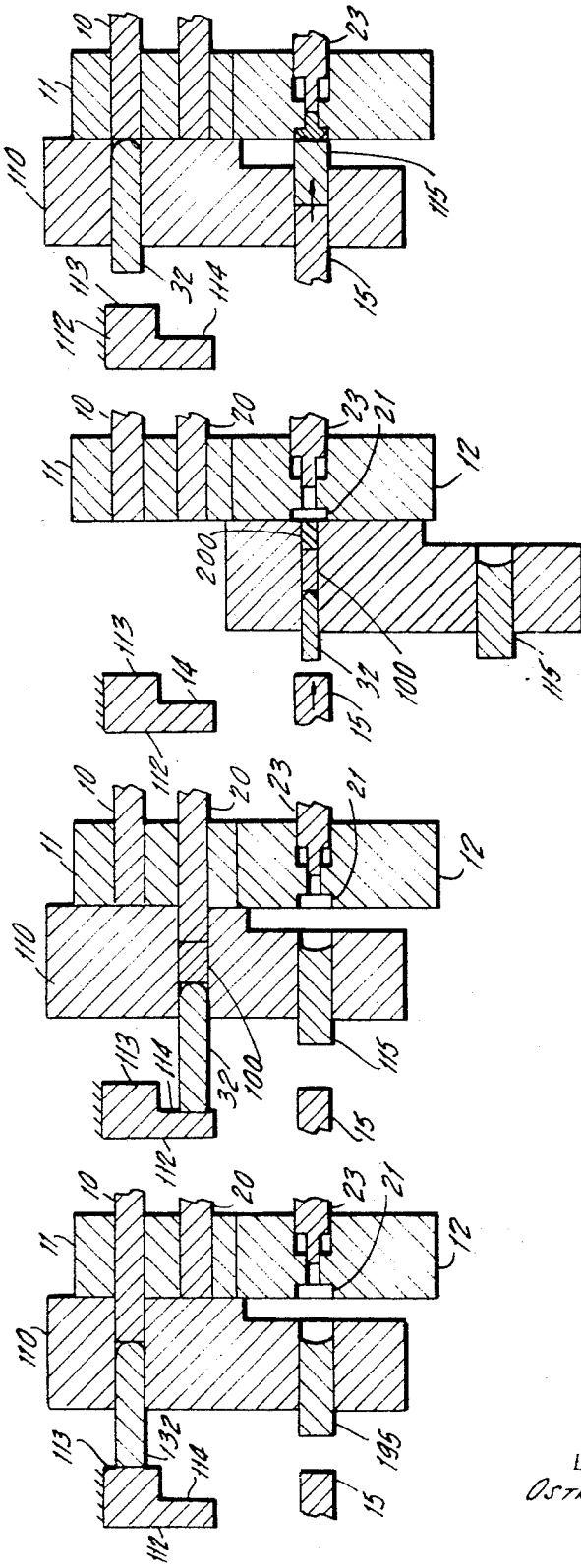

United States Patent Office 3,460,218
Patented Aug. 12, 1969

3,460,218
APPARATUS FOR FORMING COMPOSITE ELECTRICAL CONTACT USING A LINEARLY MOVING CUTTER BAR
Childress B. Gwyn, Jr., Wethersfield, Conn., assignor to Talon, Inc., Meadville, Pa., a corporation of Pennsylvania
Filed Sept. 25, 1967, Ser. No. 670,154
Int. Cl. B23b *11/00;* B23k *1/00, 5/00*
U.S. Cl. 29—34         6 Claims

ABSTRACT OF THE DISCLOSURE

Apparatus for forming composite electrical contact elements by sequentially feeding stock materials into a linearly reciprocating cutter bar which shears the materials and moves them to a bonding station for forming and bonding the contact elements by cold heading operations.

---

This application is an improvement of the apparatus shown in U.S. Patent 3,311,965, dated Apr. 4, 1967, and assigned to the assignee of the present invention.

This invention relates to an apparatus for forming composite electrical contact elements by the method disclosed in my U.S. Patent 3,311,965, and more particularly relates to an improved and simplified apparatus using a linearly moving cutter bar.

My above noted U.S. Patent 3,311,965 shows a novel process for forming a composite contact in which a rotating cutter bar rotates a center bore between three positions; a first position for loading a segment of a first material in the center bore; a second position for further loading a second material in the center bore; and a third position aligning the loaded center bore with a die and a die punch. The die punch then partly forms the composite contact element, and the die is moved to a second forming station where a punch applies a second forming blow to the element.

In accordance with the present invention, the rotating cutter bar is replaced by a linearly reciprocating member which carries a center bore, and moves the center bore from a first material receiving position to a second material receiving position and then to a die and die punch station. In addition, the die structure is not movable, but is fixed in position. This reciprocating member is further arranged to carry a second die punch as an integral part thereof so that, after the element is partly formed in the fixed die, and when the linearly movable cutter bar is moved back to its initial loading position, the second die punch is aligned with the die and the second forming operation is performed on the partly formed composite element. Clearly, this improved apparatus reduces the number of moving parts required for carrying out the process, and increases the speed of the process since the cutter bar is in its loading position when the last element formed is receiving its final forming blow.

Accordingly, a primary object of this invention is to simplify the apparatus required to form a composite contact element by sequentially cutting material segments and promptly forming them by at least two sequential forming blows.

Another object of this invention is to decrease the number of moving parts in an apparatus for forming composite contact elements using at least two sequential forming blows.

A further object of this invention is to increase the speed of operation of apparatus for forming composite contact elements.

The apparatus of the present invention will be more fully understood from the following detailed description of a preferred embodiment thereof, taken in connection with the accompanying drawing, in which:

FIGURES 8A to 8D are a series of longitudinal sections similar to FIGURE 5 illustrating the sequential steps of operation of the improved apparatus.

Figure 1:
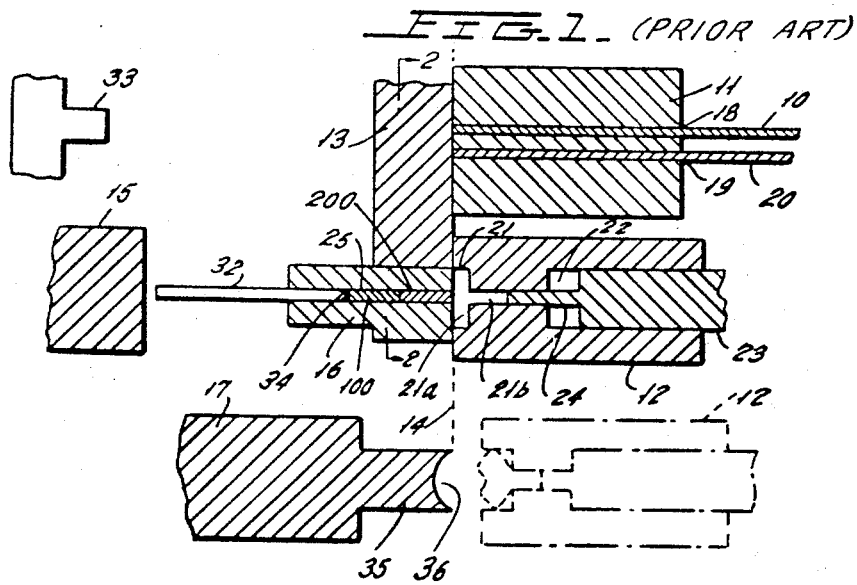
FIGURE 1 is a longitudinal section through the prior art header assembly of Patent 3,311,965 with conventional elements of the assembly deleted for purposes of clarity.

Turning to the prior art type header assembly illustrated in FIGURE 1, a feed die 11 and a forming die 12 are disposed in spaced relation from one another and abutting a cutter bar 13 along a shear plane designated at 14 in FIGURE 1. A first forming member or hammer 15 is aligned with a cutter die 16 mounted in cutter bar 13 and a second forming member or punch 17 is spaced from the hammer 15, adapted to impart at least one further forming blow to the composite element to be formed, upon movement of the forming die 12 into alignment therewith, as specified more fully hereinafter.

The feed die 11 is a stationary member which may be mounted in a holder in a conventional header, and which includes a pair of longitudinally extending, elongated passages 18 and 19 communicating at one end with the shear plane 14 adjacent cutter bar 13. Stock material, preferably wire stock, for forming the face and body portions, respectively, of the desired composite contact elements is designed to be fed through the feed passages 18 and 19. As illustrated, silver and copper wires 10 and 20 for forming such components may thus be fed through the feed die 11, the wire feed being effected by a suitable, intermittently actuated feed mechanism. One such preferred mechanism is disclosed in my copending application Ser. No. 431,310, filed Feb. 9, 1965, entitled "Method and Apparatus for Forming Composite Electrical Contact Elements."

Forming die 12 is mounted in a conventional holder to permit displacement of the die from its initial position shown in full line in FIGURE 1 to the further position illustrated in dotted line in such view. As shown, the forming die is aligned with feed die 11 and has an enlarged recess 21 communicating with the shear plane 14 and abutting cutter bar 13. The recess 21 includes, in the illustrated embodiment for forming rivet contact elements, a head-forming section 21*a* and a shank-forming section 21*b*. Section 21*a* of recess 21 possesses a diameter which is at least 1.5 times, and preferably from 2 to 4 times, the diameter of the feed passages 18 and 19 in the feed die 11. The wire segments fed through passages 18 and 19 thus possess diameters less than ⅔ the diameter to which they are expanded when mutually upset within the section 21a of the forming die.

Preferably, the forming die 12 incorporates a second recess 22 communicating with the shank-forming section 21b of recess 21 for receiving an ejector member 23 for removing the composite contact elements after formation thereof. The ejector member may be actuated by conventional header mechanism and includes a hammer element 24 reciprocally movable into the shank section 21b to eject the formed contact element from recess 21.

The cutter die 16 mounted on cutter bar 13 includes a center bore 25 for receiving components 100 and 200, respectively, sheared from wires 10 and 20, to be cold headed. The bore 25 preferably has the same diameter as passages 18 and 19, in order that the wire segments fed into the bore from such passages are slidably movable, yet cannot be laterally expanded therein.

Figure 2:
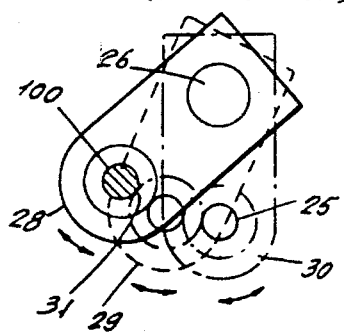
FIGURE 2 is a partial section viewed in the direction of the line 2—2 in FIGURE 1, showing the face of the cutter bar, and indicating the various positions of the bore extending therethrough, upon pivotal movement of the bar.

As best seen in FIGURE 2, the cutter bar 13 is pivotally mounted as by a pin 26 for reciprocal movement. The center bore 25 thereof may thus be oscillated through an arc, upon pivoting the cutter bar, between a first position (indicated at 28 in FIGURE 2 and shown in FIGURE 3B), in which it is aligned with feed passage 18 of feed die 11; a second position (indicated at 29 in FIGURE 2 and shown in FIGURE 3C), in which it is aligned with feed passage 19 of the feed die; and a third position (indicated at 30 and shown in FIGURE 3D), at which it is aligned with recess 21 in the forming die 12.

The wire components 100 and 200 are sheared from the wire stock material by a shear surface or knife edge 31 provided on the cutter bar 13 adjacent the bore 25 thereof. The knife edge is so disposed relative to bore 25 that it serves to smoothly shear components 100 and 200 from the wire stock 10 and 20, respectively, as the cutter bar is pivoted between the first, second and third positions of bore 25 specified above. Alternatively, it will be understood that shear surfaces may be associated with the openings of feed passages 18 and 19 on the face of the feed die, in order to effect smooth and rapid shearing of the desired contact components from the wire stock fed therethrough.

A hammer pin 32 is slidably disposed for movement through the center bore 25 of the cutter die, the pin being actuated by hammer 15 to effect the first forming blow on components 100 and 200. Movement of the hammer pin 32 is limited by an adjustable stop 33, which determines the projecting length of components 100 and 200 into bore 25. Desirably, the hammer pin includes a tapered leading edge 34 which may suitably be conical in shape, for producing a central depression in the composite element produced by the first forming blow, as will be discussed more fully hereinafter.

Figure 3A:
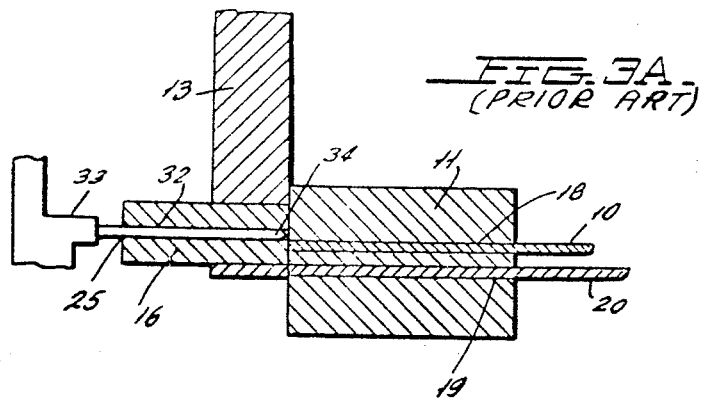
FIGURES 3A and 3F are a series of longitudinal sections similar to FIGURE 1, illustrating the sequential stages of the method for forming composite electrical contact elements employing the illustrated header assembly.
Figure 3B:
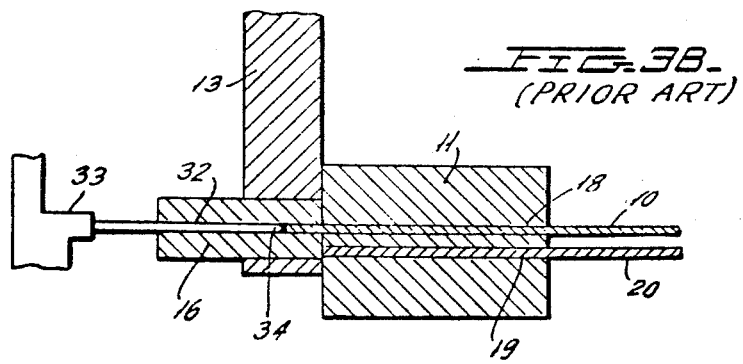
Figure 3C:
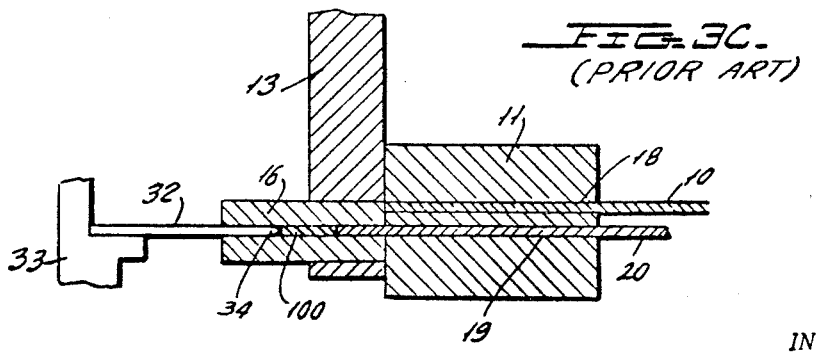
Figure 3D:
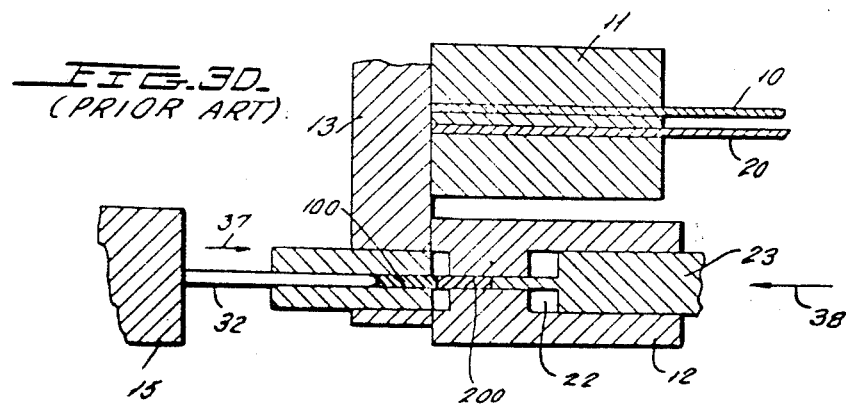
Figure 3E:
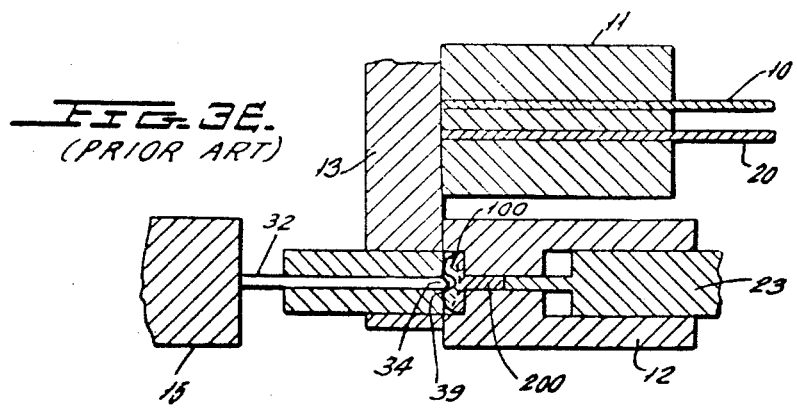
Figure 3F:
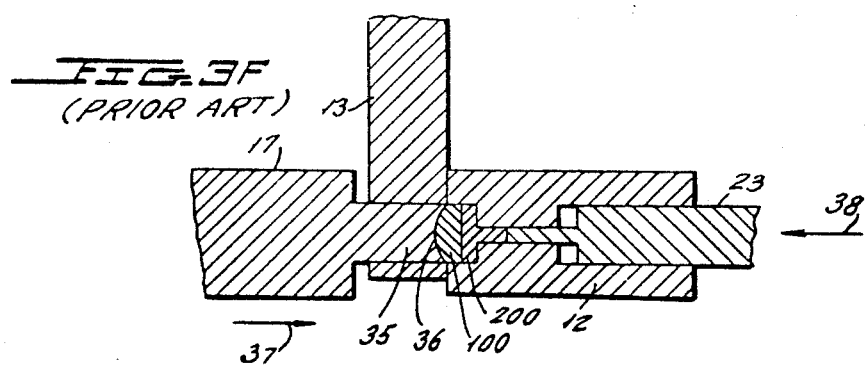

As indicated above, the forming die 12 is mounted in a suitable holder which may be shifted by the driver cam or rocker plate of a conventional header device into its second position adjacent the punch 17 (FIGURE 3F). The punch 17 includes an extension 35 having a concave forming surface 36 for imparting the second and, if desired, third forming blows to the composite element. As shown in FIGURE 3F, the punch 17 is so mounted with respect to the forming die 12 that the forming surface 36, when driven toward the forming die, enters section 21a of the recess therein, thereby closing the die.

The procedure carried out employing the apparatus of FIGURES 1 and 2 is illustrated in the successive stages of FIGURE 3. Initially, as shown in FIGURE 3A, the cutter bar is so positioned that the bore 25 thereof is not aligned with either of feed passages 18 or 19 in the feed die 11. In such position, the wire stock materials 10 and 20 fed through the feed die bear against the abutting face of the cutter bar, preventing feed of such materials through passages 18 and 19.

Upon actuation of the header drive mechanism, the cutter bar is pivoted into the position shown in FIGURE 3B, in which the bore 25 of cutter die 16 is aligned with the feed passage 18. The feed mechanism for wire stock 10 forces the component 100 of wire 10 into bore 25, pushing the hammer pin 32 outwardly of the cutter die until it strikes stop 33.

After striking stop 33, the cutter bar is further pivoted into the position illustrated in FIGURE 3C. As such pivotal movement is initiated, the knife edge 31 smoothly shears component 100 from the wire stock.

The wire stock 20 for forming the body portion of the composite contact element is thereafter fed into bore 25 and the component 200 sheared therefrom in the same manner as indicated above in connection with wire component 100. The contact face and body portion components are thus disposed in bore 25 in end-to-end abutting relation, the component 100 for forming the face portion of the composite element being disposed adjacent the hammer pin 32.

The cutter bar 13 is thereafter pivoted into the further position shown in FIGURE 3D, with the bore 25 thereof aligned with the recess 21 in forming die 12. Subsequent actuation of the hammer 15 drives the hammer piston 32 in the direction of arrow 37 imparting a first forming blow to the juxtaposed wire components 100 and 200. As illustrated in FIGURE 3D, the ejector member 23 is simultaneously actuated in the direction of arrow 38, axial pressure thereby being applied to the juxtaposed components 100 and 200 to effect mutual upsetting of the abutting ends thereof into the enlarged section 21a of the recess in the forming die. The force applied to members 15 and 23 is such that pressures of greater than one ton per square inch, and preferably from about 20 to 150 tons per square inch, are thus impressed upon the abutting contact components, the mutual expansion thereof effecting interfacial molecular bonding therebetween.

During the forward stroke of the hammer pin 32, the conical edge 34 thereof forms a depression 39 in the adjacent end of the bonded element produced thereby.

Figure 4:
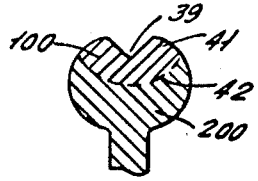
FIGURE 4 is a cross-section through an intermediate composite contact element produced after the first forming blow in FIGURES 3A and 3F.

As best shown in FIGURE 4, the composite element resulting from the first forming blow includes the aforesaid central depression 39 and an annular protuberance 41 formed in the working face portion component 100 thereof by the action of the conical edge 34 of the hammer pin. The face portion component 100 and the contact body component 200 are intimately bonded across the entire area of interface 42 therebetween, and have been expanded at least 1.5 times the initial diameter of such segments.

The forming die 12 is thereafter shifted into the position illustrated in FIGURE 3F and the punch 17 actuated in the direction of arrow 37 to effect the second forming blow on the composite contact element previously formed within the forming die recess 21. Preferably, the ejector member 23 is simultaneously actuated in the direction of arrow 38 to impart an axial pressure in excess of one ton per square inch to the bonded components. The concave forming surface 36 of punch 17 is driven into the forming recess, closing the same and thereby forcing the composite components into the shape defined by the internal walls of the head-forming section 21a and the shank-froming section 21b thereof.

Figure 5:
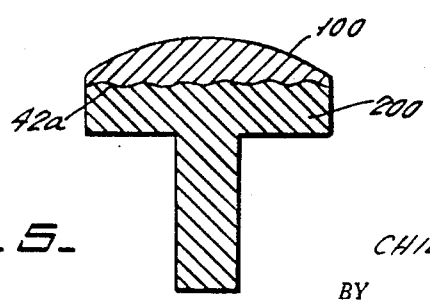
FIGURE 5 is a cross-section through a finished composite rivet contact produced in accordance herewith.

The punch 17 may, if desired, be reactuated to subject the composite contact element thus formed to a further forming blow to thereby increase the shear strength thereof. Upon retraction of the punch, after thus imparting one or more forming blows, the finished contact element is ejected from the forming die by reactuating ejector member 23, the extension 24 thereof forcing the composite element out of recess 22. The composite rivet thus produced is illustrated in FIGURE 5. As shown, the silver component 100 defining the contact working face portion of the composite element and the copper component 200 defining the body portion of the composite element, including the shank and a portion of the head thereof, are intimately bonded across substantially the entire interfacial area 42a therebetween. After formation of such composite element, the cutter bar may be reciprocated back to its initial position by conventional header mechanism and further contact elements formed, employing the indicated procedure. In this manner, at least 20, and preferably from 80 to 400, composite contact elements are formed per minute, employing each such header assembly.

The improved bonding effected by use of this process is evidenced by the following test results, in which bonding of copper and silver wire contact components was effected employing one, two and three forming blows for comparative purposes. Each of the forming blows was carried out in a header assembly substantially as described above, subjecting the composite segments bonded to axial pressures of about 30 tons per square inch during bonding. Composite rivet contacts having head diameters varying from 0.125 to 0.437 inch were thus prepared and the shear forces required to separate the contact components determined. The data thus obtained is tabulated below:

| Contact head diameter (inches) | Single blow bonding (inch pounds) | Two-stage bonding (inch pounds) | Three-stage bonding (inch pounds) |
|---|---|---|---|
| 0.125 | 60 | | |
| 0.150 | 50 | 1 340 | 2 370 |
| 0.187 | 45 | 260 | 290 |
| 0.218 | 36 | 200 | 270 |
| 0.250 | 23 | 185 | 255 |
| 0.312 | 17 | 120 | 210 |
| 0.375 | No bond | 95 | 180 |
| 0.437 | No bond | 80 | 104 |

1 Head sheared off, no separation at 300 inch pounds.
2 Same as two-stage bonding.

Composite electrical contact elements must be able to withstand shear forces of at least 50 inch-pounds to provide adequately assembly and operational safety. It will be noted from the above values that all contacts produced employing a single forming blow and having head diameters in excess of 0.150 inch did not possess adequate shear strengths by such criterion, whereas all of the composite contact elements produced employing the multiple forming blow operations of the present invention possessed well over the minimum shear strengths required for general service.

In accordance with the present invention, the process as described above is carried out by a simplified apparatus which uses a linearly movable cutter bar in place of the rotating cutter 13 of FIGURES 1 to 5. This change, as will be seen, permits a reduction in the number of moving parts, and permits an increase in speed of operation of the apparatus.

Figure 6:
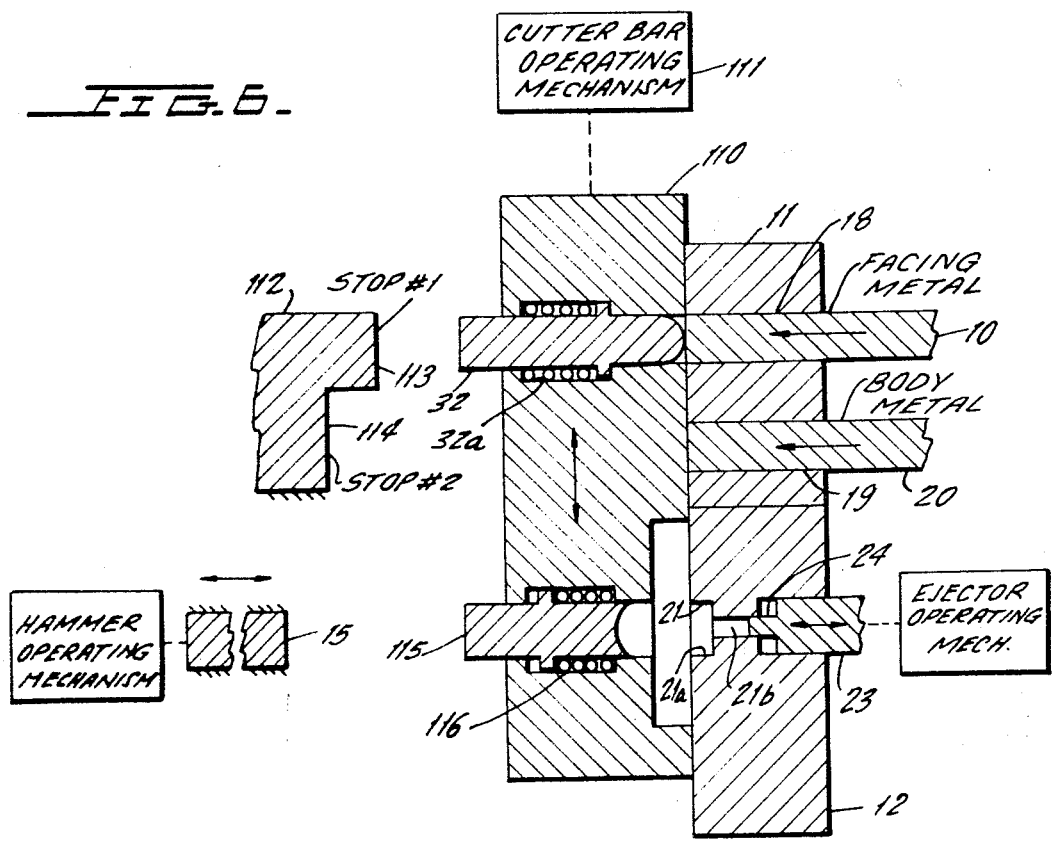
FIGURE 6 is a longitudinal section through the header apparatus of the present invention.
Figure 7:
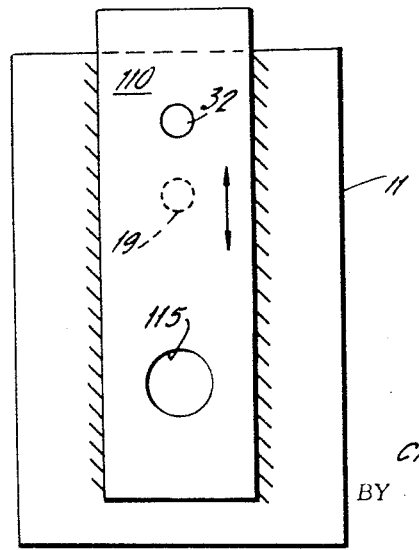
FIGURE 7 is a plan view of FIGURE 6, as seen from the left in FIGURE 6, and shows the longitudinally movable cutter bar.

The apparatus of the invention is shown in FIGURES 6 and 7 where components similar to those of FIGURES 1 to 3 have identical identifying numerals. Thus, a feed die 11 has two feed passages 18 and 19 which receive the wires 10 and 20, respectively, which are to be cold headed. Forming die 12 is then fixed to feed die 11, in accordance with the present invention, but otherwise is formed like the feed die of FIGURES 1 to 3 and carries ejector pin 23.

The cutter bar of the present invention is then formed by a bar 110 which is suitably guided for linear movement by a suitable drive mechanism 111. Linearly movable cutter bar 110 contains a longitudinally movable hammer pin 32, which in FIGURE 6 is provided with a bias spring 32a which biases pin 32 toward the position shown. A fixed stop structure 112 is then provided with stop faces 113 and 114 aligned with feed passages 18 and 19, respectively.

A longitudinally movable finishing punch 115 is also carried in cutter bar 110 and corresponds, in function, to punch 17 of FIGURES 1 to 3. A suitable bias spring 116 biases punch 115 to the position shown in FIGURE 6. Hammer 15, which is operated from a suitable operating mechanism is then fixed in alignment with recess 21 in forming die 12.

The operation of the apparatus of FIGURES 6 and 7, for forming the rivet contact of FIGURES 4 and 5, is best understood from the schematic sequential drawings of FIGURES 8A to 8D. The apparatus is initially in the position shown in FIGURE 6. Wire 10 is then injected into feed passage 18 until hammer pin 32 reaches stop surface 113 as shown in FIGURE 8A. Thereafter, cutter bar 110 is linearly moved down to cutoff component 100 and to align pin 32 and passage 19. The wire 20 then feeds into passage 19 until pin 32 reaches stop surface 114, as shown in FIGURE 8B.

Thereafter, and as shown in FIGURE 8C, the cutter bar 110 moves linearly downward, cutting off component 200, until pin 32 is aligned with recess 21 in forming die 12. Hammer 15 then strikes hammer pin 32 to initially form the two components 100 and 200 in recess 21, in the manner previously carried out in the steps shown in FIGURES 3D and 3E, to form the product of FIGURE 4.

The linearly movable cutter bar 110 is then moved upwardly to the position of FIGURE 8D, where pin 32 is aligned with feed passage 18 and punch 115 is aligned with recess 21. Hammer 15 then strikes punch 115 to perform the second forming operation to complete the product, as shown in FIGURE 5, and in the manner shown in FIGURE 3F for the prior art apparatus. The formed composite element is thereafter ejected by ejecting pin 23.

From the foregoing, it will be apparent that the apparatus is substantially simplified by moving the cutter bar 110 with linear, reciprocating motion. Thus, the forming die 12 is fixed and only a single hammer 15 is needed for both the first and second forming blows. Moreover, since the cutter bar is in position for starting a new cycle when the second forming step occurs, it will be apparent that the output of the apparatus can be increased.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A header assembly for forming a composite electrical contact element including a contact working face portion and, integral therewith, a contact body portion, which header assembly comprises:
  (a) a feed die having a pair of longitudinally extending feed passages formed therein for feeding wire stock materials for forming said working face and body portions, respectively, therethrough, said feed die being disposed adjacent a shear plane with the opening at one end of each of said passages contiguous thereto;
  (b) a forming die disposed adjacent said shear plane, the forming die having an enlarged recess therein communicating with the shear plane for receiving wire components separated from said wire stock materials to effect mutual upsetting and bonding thereof, said recess having a diameter of at least 1.5 times the diameter of each of said feed die passages;
  (c) a linearly movable cutter bar disposed adjacent said shear plane opposite from said dies and having a bore extending therethrough for receiving said wire components, the opening of one end of said bore being contiguous to the shear plane and being movable along a straight line parallel to said shear plane between a first position in alignment with a first of the feed passages in said feed die, a second position in alignment with the second of said feed passages, and a third position in alignment with the recess in said forming die;
  (d) shear means associated with one of said feed die and said cutter bar for shearing said wire components from the wire stock materials fed through the feed passages in said forming die upon movement of the cutter bar between its positions corresponding to the first, second and third positions of the bore extending therethrough;

(e) first forming means movable through the cutter bar bore for driving said wire components into the recess in said forming die, when said bore is disposed in said third position, and for imparting a first forming blow to effect mutual upsetting of the abutting ends of said components in said recess to provide bonding thereof;

(f) second forming means disposed for alignment with said forming die for imparting a second forming blow to the bonded wire components disposed in the recess in said forming die, said second forming means including means for entering the recess in the forming die to close the die and reform said wire components into the shape of the desired contact element; and (g) means for ejecting the resulting element from the recess in said forming die.

2. The header assembly for forming a composite electrical contact element, as defined in claim 1, in which said first forming means comprises a hammer pin having a shaped forward end mounted within the bore in said cutter bar for driving the wire components into the recess in said forming die and for imparting said first forming blow to said components within the recess; and in which said second forming means includes a punch movable into the recess in said forming die, when the latter is disposed in alignment therewith.

3. The header assembly for forming a composite electrical contact element, as defined in claim 1, in which said means for ejecting the completed composite contact element comprises punch means defined in said forming die aligned with and communicating with said recess formed therein, for forcing the composite contact elements out of said recess and said forming die after formation thereof.

4. The header assembly as set forth in claim 1 wherein said forming die is fixed with respect to said feed die.

5. The header assembly as set forth in claim 1 wherein said first feed passage and said recess in said forming die have a fixed separation whereby said first forming means are aligned with one another when said second forming means is aligned with said recess in said forming die.

6. The header assembly as set forth in claim 1 wherein the axis of said recess and the axis of said first feed passage are parallel to one another and are displaced from one another by a fixed distance; the axis of said first forming means and the axis of said second forming means being parallel to one another and to said axis of said feed passage, and being spaced from one another by said fixed distance.

References Cited

UNITED STATES PATENTS 3,311,965   4/1967   Gwyn _____ 29—34

RICHARD H. EANES, Primary Examiner

U.S. Cl. X.R.

228—18